United States Patent
Gaskins (10) Patent No.: US 7,457,901 B2
(45) Date of Patent: Nov. 25, 2008

(54) MICROPROCESSOR APPARATUS AND METHOD FOR ENABLING VARIABLE WIDTH DATA TRANSFERS

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 8 days.

(21) Appl. No.: 11/363,826

(22) Filed: Feb. 28, 2006

(65) Prior Publication Data
US 2007/0011377 A1   Jan. 11, 2007

Related U.S. Application Data

(60) Provisional application No. 60/696,702, filed on Jul. 5, 2005.

(51) Int. Cl.
*G06F 13/00* (2006.01)
*G06F 15/16* (2006.01)
*G06F 13/36* (2006.01)
*G06F 3/00* (2006.01)
*G06F 12/00* (2006.01)

(52) U.S. Cl. ............... 710/107; 709/203; 710/52; 710/306; 711/133; 711/154

(58) Field of Classification Search ........... 711/133, 711/154; 709/203; 710/306, 52, 107
See application file for complete search history.

(56) References Cited

U.S. PATENT DOCUMENTS

| | | | |
|---|---|---|---|
| 4,796,232 A | 1/1989 | House | |
| 5,255,378 A | 10/1993 | Crawford et al. | |
| 5,537,624 A | 7/1996 | Whitesell | |
| 5,561,780 A * | 10/1996 | Glew et al. | .......... 711/126 |
| 5,640,517 A | 6/1997 | Parks et al. | |
| 5,644,788 A | 7/1997 | Courtright et al. | |
| 5,835,741 A * | 11/1998 | Elkhoury et al. | .......... 710/310 |
| 5,901,298 A | 5/1999 | Cummins et al. | |
| 5,915,126 A | 6/1999 | Maule et al. | |

(Continued)

OTHER PUBLICATIONS

Sakamoto et al. "Microarchitecture and performance analysis of a SPARC-V9 microprocessor for enterprise server systems." High-Performance Computer Architecture. 2003. HPCA-9 2003. Proceedings. Feb. 8-12, 2003. Abstract Only.

*Primary Examiner*—Khanh Dang
*Assistant Examiner*—Christopher A Daley
(74) *Attorney, Agent, or Firm*—Gary R. Stanford; Richard K. Huffman; James W. Huffman (57) ABSTRACT

A microprocessor including processor logic and sparse write logic which asserts address signals and request signals to provide an address and a request for a cache line memory write transaction, which provides one of multiple sparse memory write transactions on the request signals and which provides corresponding enable bits on the address signals. Each sparse memory write transaction corresponds with one of multiple granularities of data. For example, if the sparse memory write transaction is a quad-pumped cache line write for eight quadwords, the enable bits may be a selected one of byte, word, doubleword, quadword, doublequadword, etc., enable bits. A method of performing a sparse write transaction including providing an address and a request for a memory write transaction, indicating that the memory write transaction is a selected sparse write transaction, asserting enable signals for the selected sparse write transaction, and providing data for the sparse write transaction.

20 Claims, 4 Drawing Sheets

MICROPROCESSOR AND SIGNALS FOR SPARSE WRITE TRANSACTIONS

U.S. PATENT DOCUMENTS

| | | | |
|---|---|---|---|
| 5,919,254 A | 7/1999 | Pawlowski et al. | |
| 5,944,806 A | 8/1999 | Melvin et al. | |
| 5,960,453 A * | 9/1999 | Pawlowski | 711/118 |
| 6,012,116 A | 1/2000 | Aybay et al. | |
| 6,032,225 A | 2/2000 | Shiell et al. | |
| 6,311,245 B1 | 10/2001 | Klein | |
| 6,356,270 B2 * | 3/2002 | Pentkovski et al. | 345/530 |
| 6,405,280 B1 | 6/2002 | Ryan | |
| 6,405,285 B1 | 6/2002 | Arimilli et al. | |
| 6,434,654 B1 | 8/2002 | Story et al. | |
| 6,505,259 B1 | 1/2003 | Garcia et al. | |
| 6,523,109 B1 | 2/2003 | Meier | |
| 6,587,862 B1 | 7/2003 | Henderson | |
| 6,601,121 B2 | 7/2003 | Singh et al. | |
| 6,609,171 B1 | 8/2003 | Singh et al. | |
| 6,671,752 B1 * | 12/2003 | Rao et al. | 710/52 |
| 6,742,160 B2 | 5/2004 | Greiner | |
| 6,804,735 B2 | 10/2004 | Singh et al. | |
| 6,807,592 B2 | 10/2004 | Singh et al. | |
| 6,907,487 B2 | 6/2005 | Singh et al. | |
| 6,954,208 B2 * | 10/2005 | Doyle et al. | 345/537 |
| 7,130,952 B2 * | 10/2006 | Nanki et al. | 710/307 |
| 7,206,865 B2 * | 4/2007 | Creta et al. | 710/5 |
| 2002/0029307 A1 | 3/2002 | Singh et al. | |
| 2002/0103948 A1 | 8/2002 | Owen et al. | |
| 2003/0088799 A1 | 5/2003 | Bodes | |
| 2004/0199723 A1 * | 10/2004 | Shelor | 711/128 |
| 2005/0066114 A1 | 3/2005 | Barth et al. | |
| 2006/0053243 A1 | 3/2006 | David et al. | |
| 2006/0190677 A1 | 8/2006 | Janzen | |

* cited by examiner

PACKET AB SIGNAL DEFINITIONS

| ADDRESS SIGNAL | SIGNAL DEFINITION |
|---|---|
| ADDR[31:24] | ATTR[7:0]. ATTRIBUTE SIGNALS. |
| ADDR[23:16] | DID[7:0]. DEFERRED ID SIGNALS |
| ADDR[15:8] | BE[7:0]. BYTE ENABLE SIGNALS – INDICATES BYTES IN ASSOCIATED QUADWORD THAT ARE TO BE TRANSFERRED. |
| ADDR[7:3] | EXF[4:0]. EXTENDED FUNCTION SIGNALS. |

*FIG. 3 (PRIOR ART)*

MICROPROCESSOR AND SIGNALS FOR SPARSE WRITE TRANSACTIONS

*FIG. 4*

PACKET REQB VALUE FOR SPARSE WRITE
― 500

| REQ[4:0] VALUE | REQUEST TYPE |
| --- | --- |
| 00XXXb | SPARSE WRITE COMBINED MEMORY WRITE (DOUBLEWORD GRANULARITY) |
| 01XXXb | SPARSE WRITE COMBINED MEMORY WRITE (QUADWORD GRANULARITY) |
| 10XXXb | SPARSE WRITE COMBINED MEMORY WRITE (DOUBLEQUADWORD GRANULARITY) |
| 11XXXb | SPARSE WRITE COMBINED MEMORY WRITE (WORD GRANULARITY) |

FIG. 5

PACKET REQB VALUE FOR SPARSE WRITE
― 600

| ADDRESS SIGNAL | SIGNAL DEFINITION |
| --- | --- |
| ADDR[31:24]:[15:8] | DE[15:0]. DOUBLEWORD ENABLE SIGNALS – INDICATES DOUBLEWORDS IN ASSOCIATED 64-BYTE WRITE THAT ARE TO BE TRANSFERRED. |
| ADDR[23:16] | DID[7:0]. DEFERRED ID SIGNALS |
| ADDR[7:3] | EXF[4:0]. EXTENDED FUNCTION SIGNALS. |

FIG. 6

PACKET REQB VALUE FOR SPARSE WRITE (QUADWORD)
― 700

| ADDRESS SIGNAL | SIGNAL DEFINITION |
| --- | --- |
| ADDR[31:24] | DON'T CARE |
| ADDR[15:8] | QE[7:0]. QUADWORD ENABLE SIGNALS – INDICATES QUADWORDS IN ASSOCIATED 64-BYTE WRITE THAT ARE TO BE TRANSFERRED. |
| ADDR[23:16] | DID[7:0]. DEFERRED ID SIGNALS |
| ADDR[7:3] | EXF[4:0]. EXTENDED FUNCTION SIGNALS. |

FIG. 7

MICROPROCESSOR APPARATUS AND METHOD FOR ENABLING VARIABLE WIDTH DATA TRANSFERS

CROSS-REFERENCE TO RELATED APPLICATIONS

This application claims the benefit of U.S. Provisional Application Ser. No. 60/696,702, filed on Jul. 5, 2005, which is herein incorporated by reference for all intents and purposes.

This application is related to the following co-pending U.S. Patent Applications, all of which have a common assignee and common inventors.

| SERIAL NUMBER | FILING DATE | TITLE |
| --- | --- | --- |
| (CNTR.2268) | Feb. 28, 2006 | APPARATUS AND METHOD FOR SPARSE LINE WRITE TRANSACTIONS |
| (CNTR.2270) | — | APPARATUS AND METHOD FOR SELECTABLE QUAD-PUMPED/DOUBLE-PUMPED ADDRESS BUS |
| (CNTR.2271) | — | FLEXIBLE WIDTH DATA PROTOCOL |
| (CNTR.2273) | — | APPARATUS AND METHOD FOR ORDERING TRANSACTION BEATS IN A DATA TRANSFER |

BACKGROUND OF THE INVENTION

1. Field of the Invention

The present invention relates to microprocessors, and more particularly to a microprocessor apparatus and method for enabling variable width data transfers which solves the problem of slow writes to memory when sparse portions of contiguous write-combined memory space have been modified.

2. Description of the Related Art

Write combines and non-temporal stores are not kept in the microprocessor but instead are written out to the memory bus. In a present day quad-pumped bus, such as is exhibited by most x86-compatible microprocessors, data transfers to memory are performed either on a cache line basis (i.e., eight quadwords for a 64-byte cache line) or on an individual quadword basis. When transferring an entire cache line, two clock cycles are required to transfer the eight associated quadwords and four quadwords are transferred during each cycle of the bus clock, thus accounting for the descriptor "quad-pumped." During this type of transfer, the entire 64-bytes are written to the bus; there is no mechanism to only write part of a cache line to memory. If only part of a cache line is to be written to memory, then the other type of data transfer must be employed, which allows for transfer of an individual quadword and, as part of the bus protocol, byte enable signals are set to indicate specific bytes within the transferred quadword that are to be written to memory. Individual quadword transfers take one bus clock cycle. In this manner, the state of the art allows for either 64 contiguous bytes to be written to memory in two clock cycles or for a single quadword to be written in a single clock cycle.

In reviewing present day microprocessor bus architectures and associated protocols, in conjunction with observations concerning how contiguous memory spaces are manipulated by application programs, the present inventor has noted that the bus protocols associated with writes of data to the memory bus, as alluded to above, are disadvantageous when sparse data within a contiguous memory space has been modified and is to be written to the bus. For example, it is common to modify checkerboard portions (e.g., every other double quadword, every other quadword, every other doubleword, etc.) within a video buffer to change some aspect of a display. Conventional microprocessors, however, do not provide a mechanism for selecting data that is to be written to memory at any granularity other than byte granularity on a quadword-by-quadword basis. A sparse write of contiguous memory is thus set up to be written to the bus and such a write is limited to individual quadword transfers.

Because the data associated with combined writes (e.g., write combines, non-temporal stores) is typically large, it is disadvantageous to not fully utilize the bandwidth of a data bus, whether that bus is quad-pumped or otherwise. Since data buses typically operate at clock speeds many times slower than that of microprocessor core clocks, it is crucial to execute combined writes to memory with optimum efficiency. It is therefore desirable to be able to write an entire cache line to memory where individual elements within that cache line can be enabled with variable width granularity.

SUMMARY OF THE INVENTION

A microprocessor according to an embodiment of the present invention includes processor logic and sparse write logic. The processor logic asserts address signals and request signals to provide an address and a request for a cache line memory write transaction, where the cache line memory write transaction comprises sending an entire cache line to memory, and where individual data elements within the cache line are enabled to be written to the memory with one of a plurality of granularities. The sparse write logic causes the processor logic to provide one of multiple sparse memory write transactions on the request signals and to provide corresponding enable bits on the address signals. Each of the plurality of sparse memory write transactions corresponds with the one of a plurality of granularities, where the corresponding plurality of enable bits determines which portions of the cache line are to be written to the memory, in accordance with the one of a plurality of granularities, and where the spare write logic causes the processor logic to replace an attribute value and byte enable bits on the address signals with the corresponding plurality of enable bits.

The processor logic may assert a first part on the address signals and the request signals to provide the address and the request for the cache line memory write transaction, and a second part on the address signals and the request signals to provide the sparse memory write transaction and to provide the enable bits. The sparse write logic may cause the processor logic to provide a number of enable bits on the request signals that corresponds with a granularity of data. The enable bits may be byte, word, doubleword, quadword, doublequadword, etc., enable bits.

In a more specific embodiment, the sparse memory write transaction is a quad-pumped cache line write transaction for writing eight quadwords. The enable bits may be a selected one of byte, word, doubleword, quadword and doublequadword enable bits.

A processor bus system according to an embodiment of the present invention includes a processor bus with address signals, data signals, and request signals, and a processor and bus agent coupled to the memory bus. The processor controls the address signals and the request signals to request a sparse memory write transaction indicating one of a plurality of width granularities of data and to provide enable bits, and controls the data signals to provide the data for the sparse memory write transaction, where the sparse memory write transaction comprises sending an entire cache line to memory, and where individual data elements within the cache line are enabled to be written to the memory with the one of a plurality of width granularities. The bus agent writes portions of the data to a memory location selected by the plurality of enable bits, where the corresponding plurality of enable bits determines the portions of the cache line which are to be written to the memory, in accordance with the one of a plurality of granularities. The processor replace an attribute value and byte enable bits on the address signal with the plurality of enable bits.

The processor may assert a first part including an address and a memory line write request on the address signals and the request signals, respectively, and a second part including a corresponding one of multiple sparse memory write transaction requests and enable bits on the address signals and the request signals, respectively. Each sparse memory write transaction request may indicate a corresponding granularity of the data. The width granularity of data may include a byte, a word, a doubleword, a quadword and a doublequadword.

The sparse memory write transaction may be a quad-pumped cache line write transaction with eight quadwords in which the enable bits are a selected one of byte, word, doubleword, quadword and doublequadword enable bits. In this case the bus agent may write portions of the eight quadwords based on the enable bits at a selected width granularity.

A method of performing a sparse write transaction according to an embodiment of the present invention includes providing, by a processor, an address and a request for a memory write transaction, where the memory write transaction comprises sending an entire cache line to memory, and where individual data elements within the cache line are enabled to be written to the memory with one of a plurality of granularities; indicating, by the processor, that the memory write transaction is a selected one of multiple sparse write transactions, where each of the plurality of sparse write transactions corresponds with the one of a plurality of granularities; replacing an attribute value and byte enable bits on address signals with a plurality of enable signals; asserting, by the processor, enable signals for the selected sparse write transaction, where the plurality of enable signals determines which portions of the cache line are to be written to the memory, in accordance with the one of a plurality of granularities; and providing, by the processor, data for the sparse write transaction.

The method may include asserting, by the processor, a first transaction part providing the address and indicating the memory write transaction. The method may include asserting, by the processor, a second transaction part including a corresponding one of multiple sparse write transaction encodings. The method may include asserting, by the processor, the second transaction part with multiple enable bits having a granularity which corresponds with the selected sparse write transaction encoding. The method may include providing a cache line of eight quadwords. The method may include asserting a selected one of byte, word, doubleword, quadword, and doublequadword enable bits. The method may include receiving, by a bus agent, the selected sparse write transaction, the enable signals, and the data, and writing portions of the data based on the enable signals at a granularity determined by the selected sparse write transaction.

BRIEF DESCRIPTION OF THE DRAWINGS

The benefits, features, and advantages of the present invention will become better understood with regard to the following description, and accompanying drawings where.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventor of the present application has recognized that it is disadvantageous to not fully utilize the bandwidth of a processor bus of a microprocessor. He has further noted that since processor buses typically operate at clock speeds many times slower than that of microprocessor core clocks, it is crucial to execute combined writes to memory with optimum efficiency. The inventor has recognized, in particular, that the conventional bus protocols associated with writes of data to the bus are disadvantageous when sparse data within a contiguous memory space has been modified and is to be written to the bus. He has therefore developed a sparse write-combined write attribute in which an entire 64-byte cache line is written to memory where individual elements within that cache line can be enabled with variable width granularity, as will be further described below with respect to FIGS. 1-7.

Figure 1:
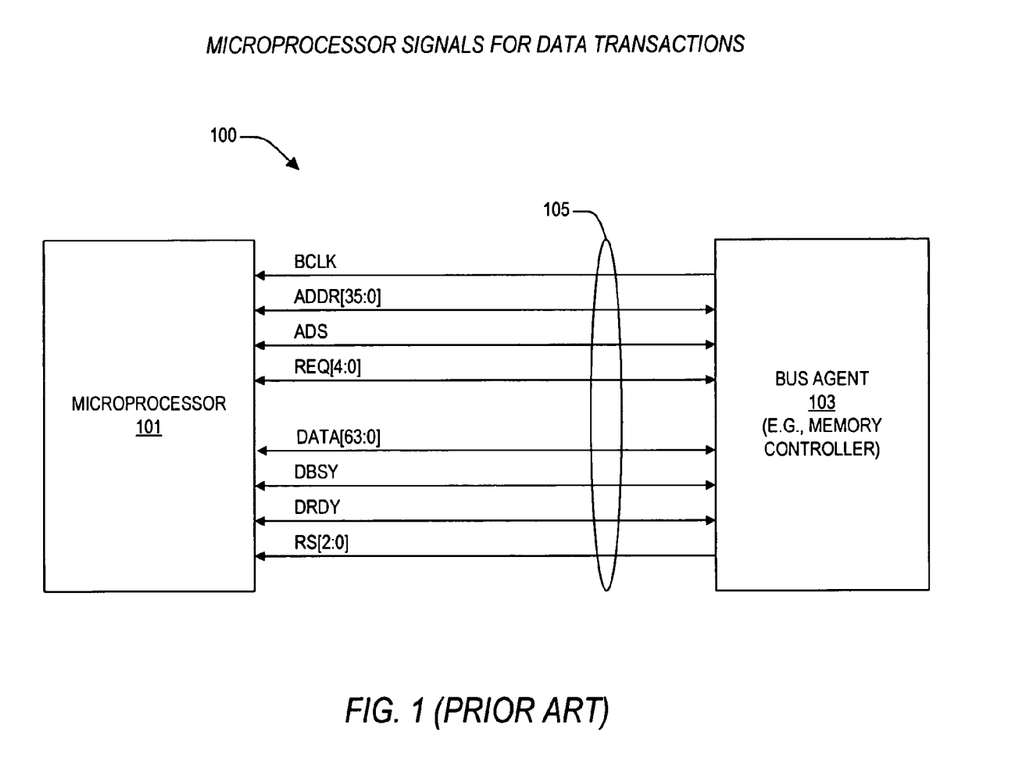
FIG. 1 is a simplified block diagram of a conventional microprocessor interface system.

FIG. 1 is a simplified block diagram of a conventional microprocessor interface system 100. The microprocessor interface system 100 includes a microprocessor 101 and a bus agent 103 interfaced with a memory bus 105. The bus agent 103 represents any number of different types of bus agents as known to those skilled in the art, such as a memory controller, a host/PCI (Peripheral Component Interconnect) bridge, etc. The processor bus 105 includes the signals for performing data transactions, including a bidirectional address bus ADDR, a bidirectional data bus DATA, and multiple control signals. In the illustrated embodiment, the ADDR bus has 36 signals shown as ADDR[35:0] and the DATA bus has 64 signals shown as DATA[63:0], although it is understood that the address and data buses may have any suitable number of signals depending upon the particular configuration and architecture. If transfers are of quadword granularity, for example, then one skilled will appreciate that only ADDR[35:3] are required. The control signals include a bus clock signal BCLK, a bidirectional address strobe signal ADS (indicating validity of the addresses on the ADDR bus), a bidirectional request bus REQ[4:0], which specifies the type of transaction requested (e.g., memory code read, memory data read, memory line write (eight quadwords), memory quadword write with byte enables), a bidirectional data bus busy signal DBSY (asserted by the entity that is providing data on the DATA bus), a data ready signal DRDY (asserted by either the device providing data during all clock cycles that data is transferred over the DATA bus), and a response bus RS which provides the type of transaction response (e.g., no data, normal data, implicit writeback) that is being completed over the DATA bus. In the illustrated embodiment, the RS bus has 3 signals shown as RS[2:0], and the REQ bus has 5 signals shown as REQ[4:0].

The signals of the memory bus 105 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Regardless of the details of the particular processor configuration, virtually all processors provide signals for communication with bus agents to indicate what type of transaction is requested, the parameters of that transaction, and to transmit or receive the data.

Figure 2:
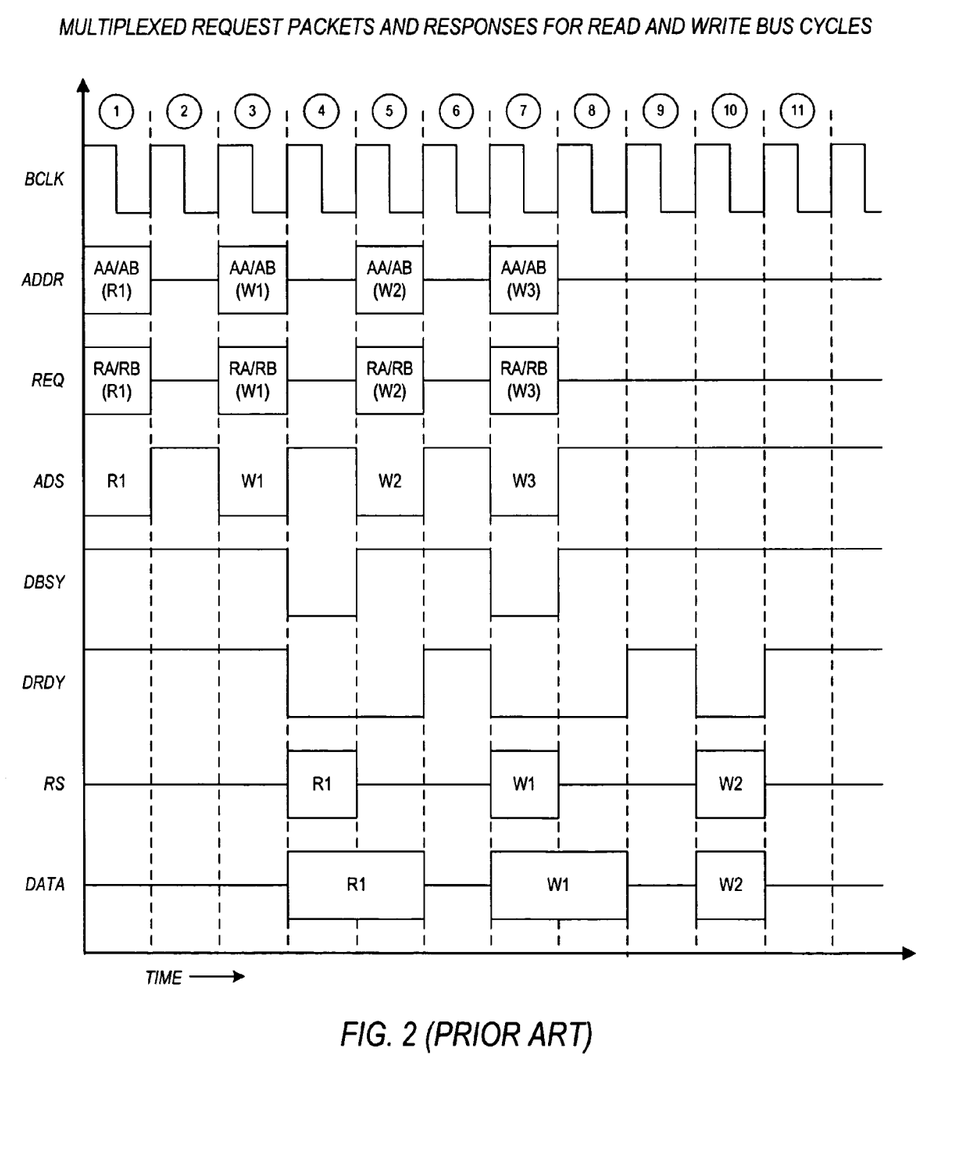
FIG. 2 is a timing diagram illustrating interaction of the signals described with reference to the conventional microprocessor interface system of FIG. 1 for performing a read transaction R1 followed by three write transactions W1, W2 and W3.

FIG. 2 is a timing diagram illustrating interaction of the signals described with reference to the conventional microprocessor interface system 100 for performing a read transaction R1 followed by three write transactions W1, W2 and W3. As shown, the BCLK, ADS, DBSY, and DRDY signals along with the ADDR, REQ, RS and DATA buses are plotted versus time. For each transaction, the microprocessor 101 provides the address on the ADDR bus and the bus agent 103 latches the address upon detection of the ADS signals. For clarity, the control signals are shown asserted as a logic low level although one skilled in the art appreciates that assertion can as well be indicated by a logic high level. Operation of such transactions and corresponding signals as named herein in an x86-compatible microprocessor are described in numerous references, including the book "Pentium Pro and Pentium II System Architecture $2^{nd}$ Edition," by Tom Shanley which is herein incorporated by reference for all intents and purposes.

Cycles of the BCLK clock signal are shown across the top of the timing diagram along with cycle numbers and the timing of transitions of the states of the signals are described with respect to the corresponding cycle number. During cycles 1, 3, 5, and 7, ADS is asserted along with addresses on the ADDR bus by the microprocessor 101 (i.e., transaction request "A" and "B" parts) to request a read transaction R1 followed by the three write transactions W1-W3. For simplicity of illustration, delays are ignored and it is understood that actual signal transitions occur during the cycle immediately following the illustrated signal transition. For example, the falling edge of the ADS signal to initiate the W1 write transaction shown occurring at the rising edge of the BLCK signal between clock cycles 2 and 3 actually occurs during clock cycle 3 after a relatively short delay. Numerous write transactions such as W1-W3 are typically executed for writes to memory of write-combined buffers and the like.

The parameters associated with each of these requests are provided in one clock cycle over the address bus ADDR and the request bus REQ. As shown, the "A" request part for each transaction is shown as "AA" for the ADDR bus and as "RA" for the REQ bus, and the "B" request part for each transaction is shown as "AB" for the ADDR bus and as RB for the REQ bus. Thus, for each read or write transaction, the ADDR bus shows "AA/AB" and the REQ bus shows "RA/RB". During the "A" part of the cycle, the ADDR bus contains the address of the transaction and the REQ bus contains the type of transaction requested (e.g., memory code read, memory data read, memory write). During the "B" part of the cycle, the request bus REQ, in the case of read and write transactions, provides the transaction length such as eight quadwords or a single quadword. If a single quadword is specified by REQ during the "B" part of the cycle, then the "B" part of the ADDR bus is interpreted according to table 300 shown in FIG. 3, in which the address signals ADDR[31:24] specify the attribute of the transfer (e.g., uncacheable, write-combined, write-through, etc.), and in which the address signals ADDR[15:8] specify byte enables that indicate specific bytes within the individual quadword which are to be written to memory.

Accordingly, during cycle 1, the ADDR and REQ buses specify a cache line read R1. The data associated with the read transaction R1 is transferred during cycles 4 and 5. During cycle 3, a cache line write transaction W1 is requested via the ADDR and REQ buses and the associated cache line is written out during cycles 7 and 8. During cycle 5, an individual quadword write transaction W2 is specified via the ADDR and REQ buses and the associated quadword is written during cycle 10. If the modified data associated with write transfer W2 is part of a sparse modified buffer, then during cycle 7, the ADDR and REQ buses contain the parameters to write the next quadword of that sparse modified buffer to memory.

Figure 3:
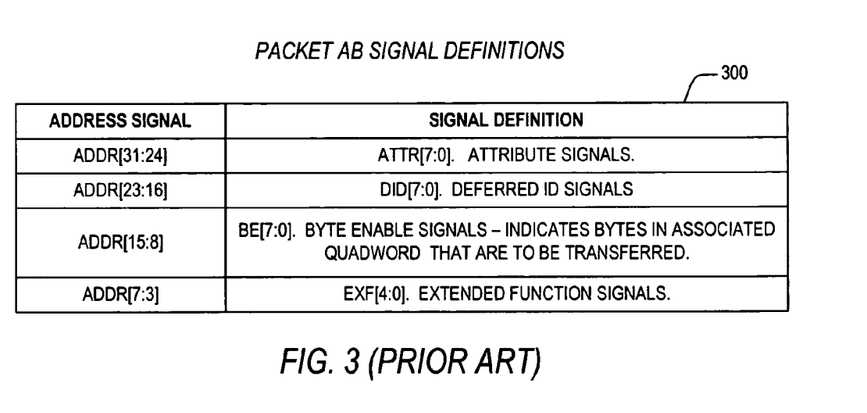
FIG. 3 is a diagram of a table illustrating signal definitions of address signals of the address (ADDR) bus if a single quadword is specified by the request (REQ) bus during the "B" request part of a write cycle.

FIGS. 2 and 3 illustrate that it is inefficient to transfer sparsely modified areas of contiguous memory via individual quadword transfers. And as noted above, conventional microprocessors do not provide a mechanism for describing selected portions of data that is to be written to memory at any granularity other than byte granularity on a quadword-by-quadword basis. Because the data associated with write-combined memory buffers is typically large, it is disadvantageous to not fully utilize the bandwidth of a data bus. And since data buses typically operate at clock speeds many times slower than that of microprocessor core clocks, it is crucial to execute combined writes to memory with optimum efficiency. It is therefore desirable to be able to write an entire cache line to memory where individual elements within that cache line can be enabled with variable width granularity.

A system and method according to an embodiment of the present invention provides for new types of attributes known as a sparse write-combined writes that is specified as an improvement to existing x86 bus protocol. In a sparse write-combined write transaction according to an embodiment of the present invention, an entire 64-byte cache line is written to memory and enable bits are indicated during part "B" of a request cycle in a manner analogous to how byte enables are presently specified in an individual quadword write. The specific attribute that is specified for the sparse write determines the width granularity of the enable bits.

Figure 4:
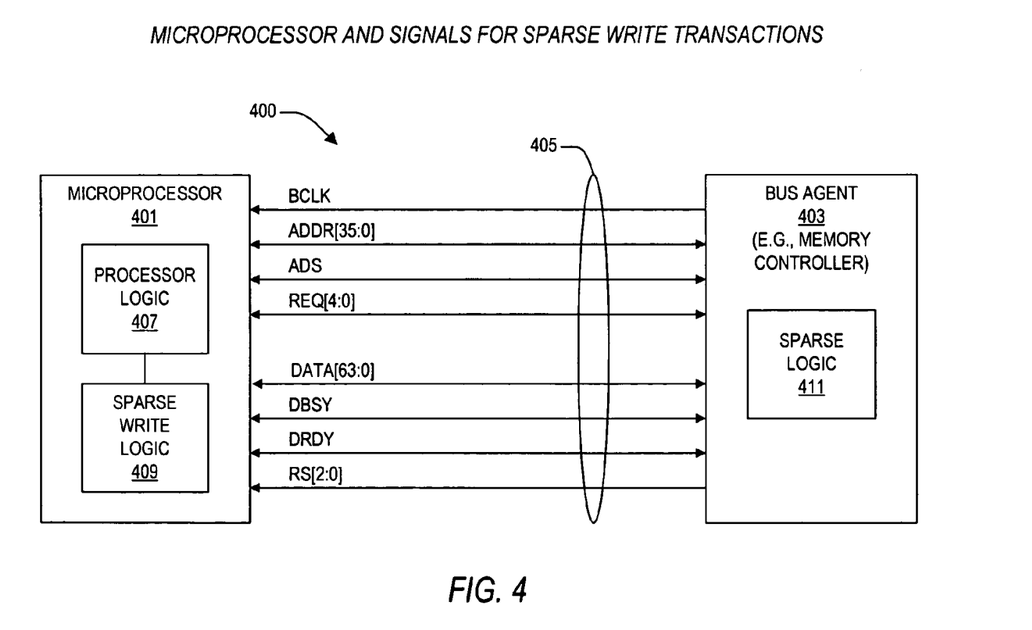
FIG. 4 is a simplified block diagram of a microprocessor interface system implemented according to an embodiment of the present invention.

FIG. 4 is a simplified block diagram of a microprocessor interface system 400 implemented according to an embodiment of the present invention. The microprocessor interface system 400 includes a microprocessor 401 and a bus agent 403 interfaced with a memory bus 405. The signals of the memory bus 405 are substantially similar as those of the microprocessor interface system 400 and operate in a substantially similar manner, with the exception that the values of the ADDR and REQ buses are modified during part "B" of the request cycle to provide for specification of a sparse write-combined write transaction as further described below. The microprocessor 401 includes processor logic 407 and sparse write logic 409. The processor logic 407 is substantially similar to processor logic (not shown) within the microprocessor 101 for interfacing the ADDR, DATA and REQ buses and the other control signals and for performing the microprocessor functions. The sparse write logic 409 is shown as a separate entity internally coupled to the processor logic 407. In an alternative embodiment, the sparse write logic 409 is incorporated within the processor logic 407. In one embodiment, the sparse write logic 409 is part of store logic (not shown).

The sparse write logic 409 determines whether areas of memory that are scheduled for transfer to the memory bus 405 are sparse or otherwise. If these areas are sparse, then sparse write transactions are scheduled and executed to provide for efficient transfer of the data. The bus agent 403 includes sparse logic 411 which modifies the function of bus agent 403 to enable sparse write transactions to memory. In particular, the sparse logic 411 enables the bus agent 403 to detect, decode and perform sparse write transactions provided on the memory bus 405 by the microprocessor 401. The sparse logic 411 enables the bus agent 403 to write selected portions of the data of each sparse write transaction as determined by enable bits provided in the request portion of the sparse write transaction. The attribute that is specified for the sparse write transaction determines the width granularity of the enable bits.

Figures 5, 6:
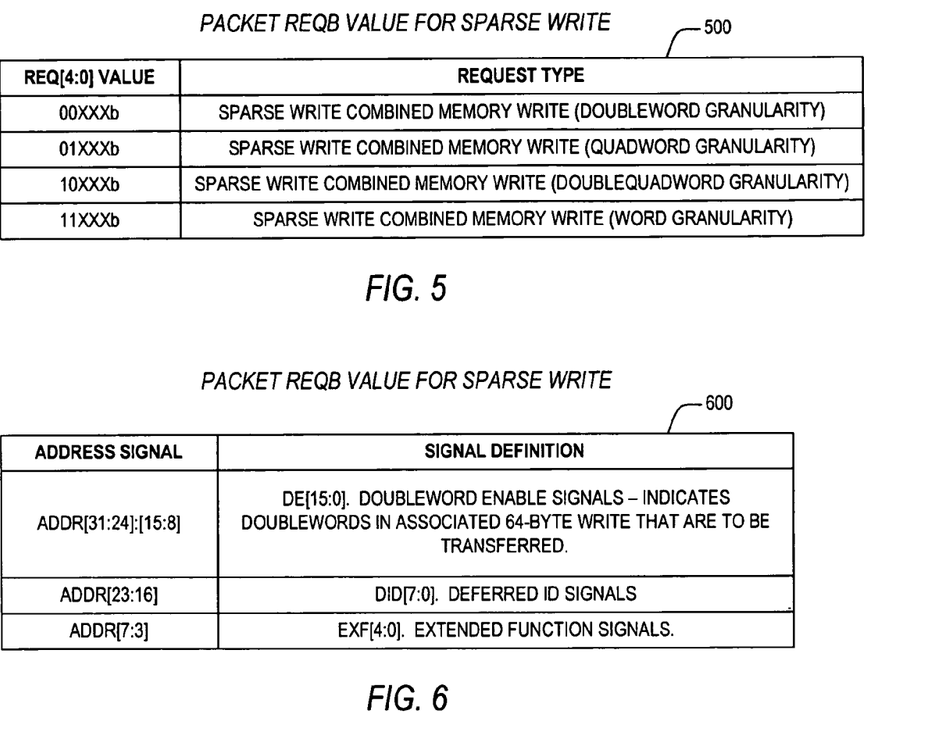
FIG. 5 is a diagram of a table illustrating an exemplary encoding of selected request signals of the REQ bus during part "B" of a request cycle according to an embodiment of the present invention to achieve variable width granularity.
FIG. 6 is a diagram of a table showing signal definitions for selected address signals of the ADDR bus during part "B" of a sparse write-combined request cycle to achieve doubleword granularity when the signals of the REQ bus indicate a sparse write-combined write transaction.

FIG. 5 is a diagram of a table 500 illustrating an exemplary encoding of the request signals REQ[4:0] during part "B" of a request cycle according to an embodiment of the present invention to achieve variable width granularity. Accordingly, encoding bits 4:3 to a binary value of 00b (in which an appended lowercase "b" denotes binary signals) indicates a sparse write-combined memory write transaction with doubleword (32-bit) granularity. Encoding bits 4:3 to 01b indicates a sparse write combined memory write with quadword (64-bit) granularity. Likewise encoding bits 4:3 to 10b specifies doublequadword (128-bit) granularity and 11b specifies word (16-bit) granularity. Although specific encodings of REQ[4:3] are shown in table 500, it is noted that such encodings and choice of specific existing bus signals are provided in exemplary fashion in order to teach the present invention and that alternative signal groups and encodings are contemplated without departing from the spirit and scope provide for herein. For instance, byte (8-bit) granularity is also contemplated as well.

FIG. 6 is a diagram of a table 600 showing signal definitions for selected address signals of the ADDR bus during part "B" of a sparse write-combined request cycle to achieve doubleword granularity when the signals of the REQ bus indicate a sparse write-combined write transaction. Deferred ID and extended function signals are as provided for presently in an x86 processor. The ADDR[31:24] and ADDR[15:8] signals, however, no longer indicate attribute and byte enables, respectively. Instead, when the REQ bus indicates the sparse write-combined write transaction, these two fields are concatenated to form a doubleword enable field DE[15:0] whose individual bits indicate specific doublewords within an associated cache line that are to be written to memory. For the sparse write command, the attribute value and the byte enable bits of the ADDR bus are replaced by doubleword enable bits. Each doubleword enable bit corresponds to a doubleword in the eight quadwords of the write transaction. In one embodiment, for example, each doubleword enable bit of the DE field is asserted to a logic "1" to specify that the corresponding doubleword in the eight quadwords of data of the sparse write-combined write transaction is to be written to a corresponding doubleword in memory, whereas a logic "0" indicates that the corresponding doubleword on the memory bus 405 is to be ignored so that the corresponding doubleword in memory remains unchanged. In this manner, it is possible to modify any selected combination of doublewords in a single sparse write-combined write transaction, such as every other doubleword in a 64 byte section of a video buffer.

Figure 7:
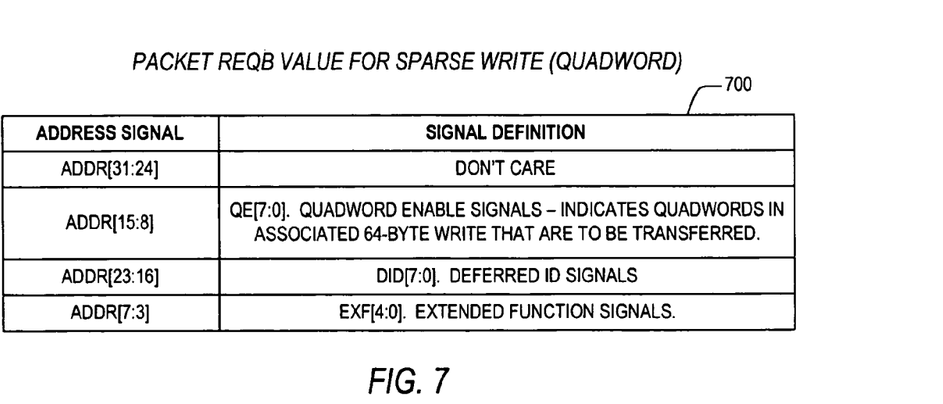
FIG. 7 is a diagram of a table showing signal definitions for selected address signals of the ADDR bus during part "B" of a sparse write-combined request cycle to achieve quadword granularity when the signals of the REQ bus indicate a sparse write-combined write transaction.

FIG. 7 is a diagram of a table showing signal definitions for selected address signals of the ADDR bus during part "B" of a sparse write-combined request cycle to achieve quadword granularity when the signals of the REQ bus indicate a sparse write-combined write transaction. Deferred ID and extended function signals are as provided for presently in an x86 processor. The ADDR[31:24] signals, however, are ignored and the ADDR[15:8] signals no longer indicate byte enables. Instead, the ADDR[15:8] signals form a quadword enable field QE[7:0] whose individual bits indicate specific quadwords within an associated cache line that are to be written to memory.

Like the exemplary encodings of the request bus REQ[4:0] shown in table 500, the specific encodings and signal choices of tables 600 and 700 are provided to teach how variable width granularity for sparse writes are provided for by the present invention. It is noted, however, that the present invention is not restricted to the specific granularities, signal names, values, or processor bus protocol given in these examples.

Although the present invention has been described in considerable detail with reference to certain preferred versions thereof, other versions and variations are possible and contemplated. For example, the particular sizes of the address, data and/or request buses may be modified. Inverse logic may be employed. The specified width granularities are exemplary only such that different width granularities are contemplated depending upon the amount of data transferred in the sparse write transaction. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

What is claimed is:

1. A microprocessor, comprising:
   processor logic which asserts address signals and request signals to provide an address and a request for a cache line memory write transaction, wherein said cache line memory write transaction comprises sending an entire cache line to memory, and wherein individual data elements within said cache line are enabled to be written to said memory with one of a plurality of granularities; and
   sparse write logic, coupled to said processor logic, which causes said processor logic to provide one of a plurality of sparse memory write transactions on said request signals and to provide a corresponding plurality of enable bits on said address signals;
   wherein each of said plurality of sparse memory write transactions corresponds with said one of a plurality of granularities, and wherein said corresponding plurality of enable bits determines which portions of said cache line are to be written to said memory, in accordance with said one of a plurality of granularities; and wherein said spare write logic causes said processor logic to replace an attribute value and byte enable bits on said address signals with said corresponding plurality of enable bits.

2. The microprocessor of claim 1, wherein said processor logic asserts a first part on said address signals and said request signals to provide said address and said request for said cache line memory write transaction, and which asserts a second part on said address signals and said request signals to provide said one of said plurality of sparse memory write transactions and to provide said plurality of enable bits.

3. The microprocessor of claim 2, wherein said sparse write logic causes said processor logic to provide a number of enable bits on said request signals that corresponds with said one of said plurality of granularities of data.

4. The microprocessor of claim 3, wherein said plurality of enable bits comprises a plurality of quadword enable bits.

5. The microprocessor of claim 3, wherein said wherein said plurality of enable bits comprises a plurality of doubleword enable bits.

6. The microprocessor of claim 1, wherein said one of said plurality of sparse memory write transactions comprises a quad-pumped cache line write transaction for writing eight quadwords.

7. The microprocessor of claim 6, wherein said plurality of enable bits comprises a selected one of byte, word, doubleword, quadword and doublequadword enable bits.

8. A processor bus system, comprising:
a memory bus comprising address signals, data signals, and request signals;
a processor, coupled to said memory bus, which controls said address signals and said request signals to request a sparse memory write transaction indicating one of a plurality of width granularities of data and to provide a plurality of enable bits, and which controls said data signals to provide said data for said sparse memory write transaction, wherein said sparse memory write transaction comprises sending an entire cache line to memory, and wherein individual data elements within said cache line are enabled to be written to said memory with said one of a plurality of width granularities; and
a bus agent, coupled to said memory bus, which writes portions of said data to a memory location selected by said plurality of enable bits, wherein said corresponding plurality of enable bits determines said portions of said cache line which are to be written to said memory, in accordance with said one of a plurality of granularities;
wherein said processor replaces an attribute value and byte enable bits on said address signals with said plurality of enable bits.

9. The processor bus system of claim 8, wherein said processor asserts a first part comprising an address and a memory line write request on said address signals and said request signals, respectively, and asserts a second part comprising a corresponding one of a plurality of sparse memory write transaction requests and said plurality of enable bits on said address signals and said request signals, respectively.

10. The processor bus system of claim 9, wherein each of said plurality of sparse memory write transaction requests indicates a corresponding one of said plurality of width granularities of said data.

11. The processor bus system of claim 10, wherein said plurality of width granularities of data comprises a byte, a word, a doubleword, a quadword and a doublequadword.

12. The processor bus system of claim 8, wherein said sparse memory write transaction comprises a quad-pumped cache line write transaction with eight quadwords and wherein said plurality of enable bits comprises a selected one of byte, word, doubleword, quadword and doublequadword enable bits.

13. The processor bus system of claim 12, wherein said bus agent writes portions of said eight quadwords based on said plurality enable bits and at a selected width granularity.

14. A method of performing a sparse write transaction, comprising:
providing, by a processor, an address and a request for a memory write transaction, wherein the memory write transaction comprises sending an entire cache line to memory, and wherein individual data elements within the cache line are enabled to be written to the memory with one of a plurality of granularities;
indicating, by the processor, that the memory write transaction is a selected one of a plurality of sparse write transactions, wherein each of the plurality of sparse write transactions corresponds with the one of a plurality of granularities;
replacing an attribute value and byte enable bits on address signals with a plurality of enable signals;
asserting, by the processor, the plurality of enable signals for the selected sparse write transaction, wherein the plurality of enable signals determines which portions of the cache line are to be written to the memory, in accordance with the one of a plurality of granularities; and
providing, by the processor, data for the sparse write transaction.

15. The method of claim 14, wherein said providing an address and a request for a cache line memory write, comprises asserting, by the processor, a first transaction part providing the address and indicating the memory write transaction.

16. The method of claim 15, wherein said indicating that the memory write transaction is a selected one of a plurality of sparse write transactions comprises asserting, by the processor, a second transaction part including a corresponding one of a plurality of sparse write transaction encodings.

17. The method of claim 16, wherein said asserting a plurality of enable signals for the selected sparse write transaction comprises asserting, by the processor, the second transaction part with a plurality of enable bits having a granularity which corresponds with the selected sparse write transaction encoding.

18. The method of claim 14, wherein said providing data for the selected sparse write transaction comprises providing a cache line of eight quadwords.

19. The method of claim 18, wherein said asserting a plurality of enable signals comprises asserting a selected one of byte, word, doubleword, quadword, and doublequadword enable bits.

20. The method of claim 14, further comprising:
receiving, by a bus agent, the selected sparse write transaction, the plurality of enable signals, and the data; and
writing portions of the data based on the plurality of enable signals at a granularity determined by the selected sparse write transaction.

* * * * *